(12) United States Patent
Owens et al.

(10) Patent No.: US 8,626,348 B2
(45) Date of Patent: Jan. 7, 2014

(54) METHODS AND SYSTEMS FOR COMMUNITY ENERGY MANAGEMENT

(75) Inventors: Betsy Owens, Winnetka, IL (US); Jim Belich, St. Charles, IL (US); Jaime A. Borras, Miramar, FL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 96 days.

(21) Appl. No.: 13/298,762

(22) Filed: Nov. 17, 2011

(65) Prior Publication Data

US 2012/0296484 A1 Nov. 22, 2012

Related U.S. Application Data

(60) Provisional application No. 61/415,060, filed on Nov. 18, 2010.

(51) Int. Cl.
| | |
|---|---|
| *G05D 7/00* | (2006.01) |
| *G05D 11/00* | (2006.01) |
| *G05D 5/00* | (2006.01) |
| *G05D 9/00* | (2006.01) |
| *G05D 17/00* | (2006.01) |

(52) U.S. Cl.
USPC ........... 700/286; 700/282; 700/291; 700/295; 700/297

(58) Field of Classification Search
USPC .......................... 700/282, 295, 286, 291, 297
See application file for complete search history.

(56) References Cited

U.S. PATENT DOCUMENTS

| | | | | |
|---|---|---|---|---|
| 5,984,579 | A * | 11/1999 | McClimans | 405/129.2 |
| 7,280,893 | B2 * | 10/2007 | Spool et al. | 700/291 |
| 7,349,765 | B2 * | 3/2008 | Reaume et al. | 700/295 |
| 8,219,258 | B1 * | 7/2012 | Almeida et al. | 700/291 |
| 8,509,954 | B2 * | 8/2013 | Imes et al. | 700/286 |
| 2006/0190139 | A1 * | 8/2006 | Reaume et al. | 700/291 |
| 2010/0145535 | A1 * | 6/2010 | Tyler et al. | 700/292 |
| 2011/0022239 | A1 * | 1/2011 | Forbes et al. | 700/286 |
| 2012/0029717 | A1 * | 2/2012 | Cox et al. | 700/295 |
| 2012/0035776 | A1 * | 2/2012 | Zaragoza et al. | 700/291 |
| 2012/0120306 | A1 * | 5/2012 | Schindler et al. | 348/372 |
| 2012/0330473 | A1 * | 12/2012 | Meredith et al. | 700/291 |

* cited by examiner

*Primary Examiner* — Ronald Hartman, Jr.
(74) *Attorney, Agent, or Firm* — McAndrews, Held & Malloy, Ltd.

(57) ABSTRACT

A community based energy management method which avoids energy peaks oftentimes associated with the restart of appliances after the delayed start of an appliance due to energy use restrictions is lifted by a utility company. The method includes the application of a queue model, such as a first-in, first-out model for the restart time of any delayed electrical device.

30 Claims, 6 Drawing Sheets

METHODS AND SYSTEMS FOR COMMUNITY ENERGY MANAGEMENT

CROSS REFERENCE TO RELATED APPLICATION

This application is a non-provisional application claiming priority from U.S. Provisional Application Ser. No. 61/415,060, filed Nov. 18, 2010, entitled "Community Energy Management System and Appliances," and is related to U.S. patent application Ser. No. 13/248,155 entitled "Energy Management Unit With Diagnostic Capabilities," filed Sep. 29, 2011, the contents of which are each incorporated herein by reference in their entirety.

FIELD OF THE DISCLOSURE

The present disclosure generally relates to managing the energy usage of a community of appliances, and more particularly, to methods and systems for community energy management.

BACKGROUND

The current "smart grid" initiative using "smart meters" is driving appliance and equipment manufacturers to provide connectivity that can respond to and control the peak energy loads in residential and business settings. Smart meters raise consumer awareness of the cost and impact of electric devices. Such devices typically utilize ZigBee® communication protocol for wireless home area networks relying upon different energy profiles to deliver both energy and other information. As ZigBee® is a relatively low data rate wireless protocol that does not support streaming of content or downloads for remote software updates and applications, WiFi is used complementarily.

For instance, ZigBee is a wireless language connecting different devices to work together. Available ZigBee networks provide a suggested standard for deploying switches, sensors, and controllers using harvested energy in residential, commercial and, industrial environments. The ZigBee networks include a physical radio using IEEE 802.15.4 standard radios operating in a 2.4 GHz band. The proposed ZigBee standard seeks to provide interference avoidance, mesh networking, security, certification, and an open standard.

The emerging Smart Grid provides residential users flexibility in controlling their electricity costs. A primary driving force is the smart meter which can deliver near real-time electricity prices to homes. The consumer can make use of this information via an in-home energy management controller, which uses prices and user preferences to control power usage across the home. The energy management unit, which may be standalone or embedded in the smart meter or appliance.

The problem observed with the Smart Grid unit is that there is a "rebound" effect wherein the "scheduled" energy management includes more peaks than the "non-scheduled" solution, thereby negating benefits of off-peak pricing models. For example, FIG. 1 shows a prior art simulation of an identified "rebound" problem that occurs at the end of a peak pricing period as identified by L. Snyder, S. Kishore, "Control Mechanisms for Residential Electricity Demand in Smart Grids", IEEE Smart Grid Communications Conference, October 2010. Specifically, FIG. 1 illustrates a plot 2 of the total power consumption of a simulated fifty home community over a three day period. As noted, a utility company may provide information regarding various peak pricing periods 4 throughout a predetermined time period. The consumer can make use of this information via the in-home energy management controller (EMC) to delay power usage until the end of the peak pricing period 4.

Although the scheduled system reduces the peak demand to a small extent, it also creates a new, even larger "rebound" peak 6, immediately after the peak pricing period 4 ends and off-peak prices begin. As illustrated, the maximum load is larger in the scheduled system than in the non-scheduled system (83.2 vs. 68.0 kW), as is the standard deviation of the load across periods (13.2 vs. 11.3 kW). This rebound peak 6 occurs even though the request intensity during off-peak hours is low. Therefore, it is clear that the off-peak pricing model fails to achieve its goal of reducing load peaks, and may even worsen the problem.

To overcome the "rebound" peak 6, the previous system proposed a complex power scheduling protocol in a Smart Grid system, as well as two optimization methods for choosing the timing of appliance operation within a home. The authors distributed scheduling mechanism guarantees homes a base power level while allowing them to compete for the remaining available power. The acknowledged problem being that the proposed optimization methods are complex in nature and do not work for all power grid configurations.

DETAILED DESCRIPTION

The following description of example methods and apparatus is not intended to limit the scope of the description to the precise form or forms detailed herein. Instead, the following description is intended to be illustrative so that others may follow its teachings.

Example methods and systems for providing community energy management for a plurality of appliances are disclosed herein. In general, the disclosed examples allow for the monitoring and/or control of smart grid enabled appliances in a local household and/or community. In this way, the utility provider may be able to provide finer energy control at the business, consumer house, and/or community, while the utility customer will achieve energy management, including possible price reductions. In some embodiments, because the described examples include the ability to schedule various appliances/devices outside of the direct control of the smart grid, the disclosed system may alleviate the "loss of control" concern sometimes felt by the electrical user.

The example systems disclosed herein allow for the interoperability of different manufacturers of smart household appliances, either through built-in devices, or externally connected devices, to monitor the community of device's electrical usage. In one example an external and/or internal Energy Management Unit (EMU) measures the energy consumption of the connected appliance and/or other electrical device and stores data regarding the energy usage. The EMU may be provided with a capability to regulate the power consumption of a device and/or the capability to switch the device on and off. The energy consumption data is transmitted to a home hub, which processes the energy usage data from all connected devices and schedules the device usage utilizing any suitable algorithm, including, for example a first-in, first-out algorithm, a prioritized algorithm, and/or any suitable combination thereof.

In one example, the system provides the use of commodity hardware, off the shelf software, OS independent applications, form factor independent devices (PC, tablets, smart phones, etc), media independent (voice, text, video) and a cloud based infrastructure to run all functionalities of the appliance connectivity. This is in contrast to the specialized hardware, proprietary software and/or dedicated, non-interconnected processors that typically run current appliances. In the context of a consumer environment, such as for example, a residence, the disclosed methods and systems are particularly useful for providing enhanced services as will be described in detail herein.

Figure 1:
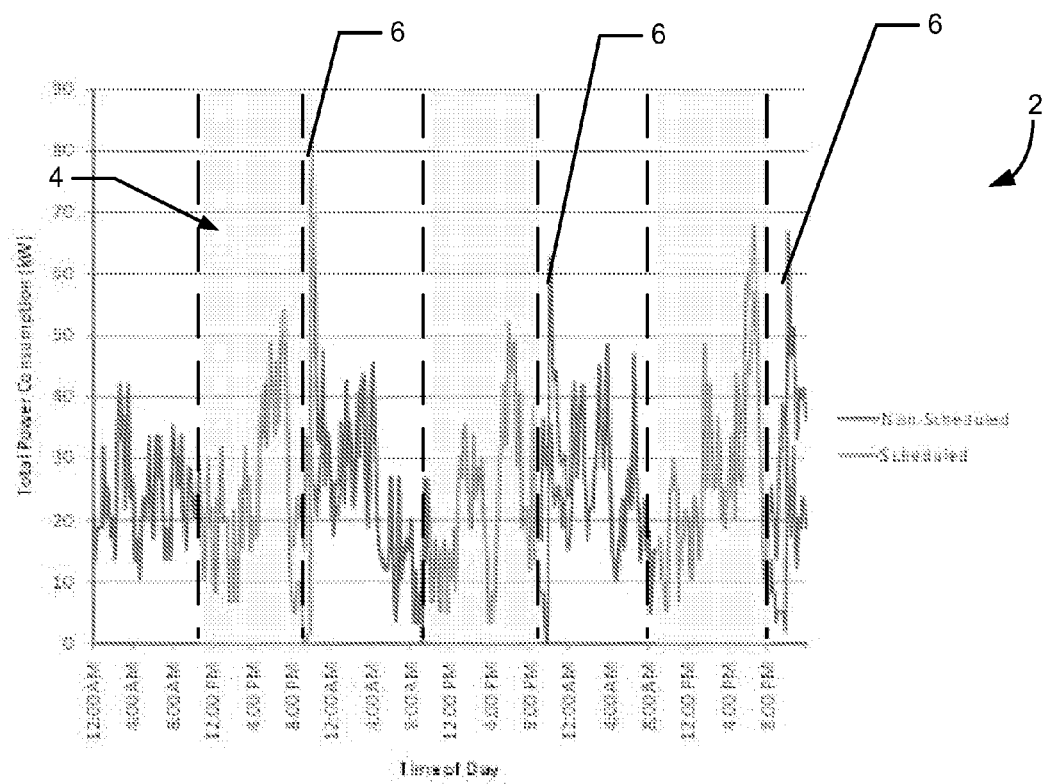
FIG. 1 is prior art plot showing a simulation of a "rebound" peak problem at the end of a pricing peak period.
Figure 2:
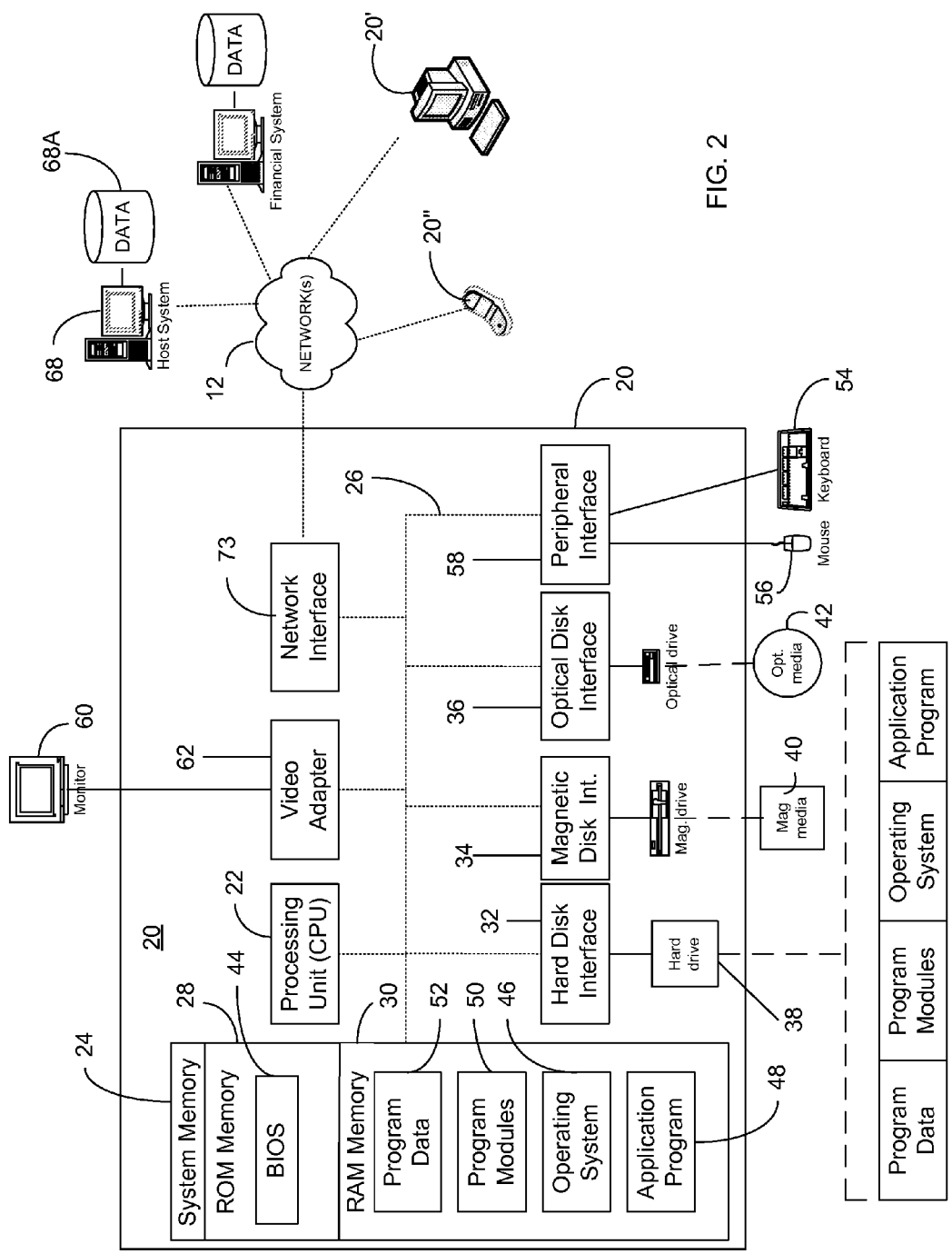
FIG. 2 is illustrates in block diagram form components of an example, computer network environment suitable for implementing the example community energy management system disclosed.

With reference to the figures, the following discloses various example systems and methods for providing community energy management. To this end, FIG. 2 illustrates a processing device 20", illustrated in the exemplary form of a mobile communication device, a processing device 20', illustrated in the exemplary form of a computer system, and a processing device 20 illustrated in schematic form, such as for example, an appliance, are provided with executable instructions to, for example, provide a means for a customer, e.g., a user, consumer, etc., to interact with the device 20 and/or to access a host system server 68. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 2 may be embodied in any device having the ability to execute instructions such as, by way of example, an appliance, a personal computer, mainframe computer, personal-digital assistant ("PDA"), cellular telephone, tablet, ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local and/or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those of ordinary skill in the art will further appreciate that other types of non-transitory computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, motion sensor, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this example, the server 68 may act as a scheduler as described herein. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, receiving information regarding at least one appliance's energy usage, receiving information regarding the operation of the smart grid, and providing a scheduling service to coordinate the use of the appliance.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 3:
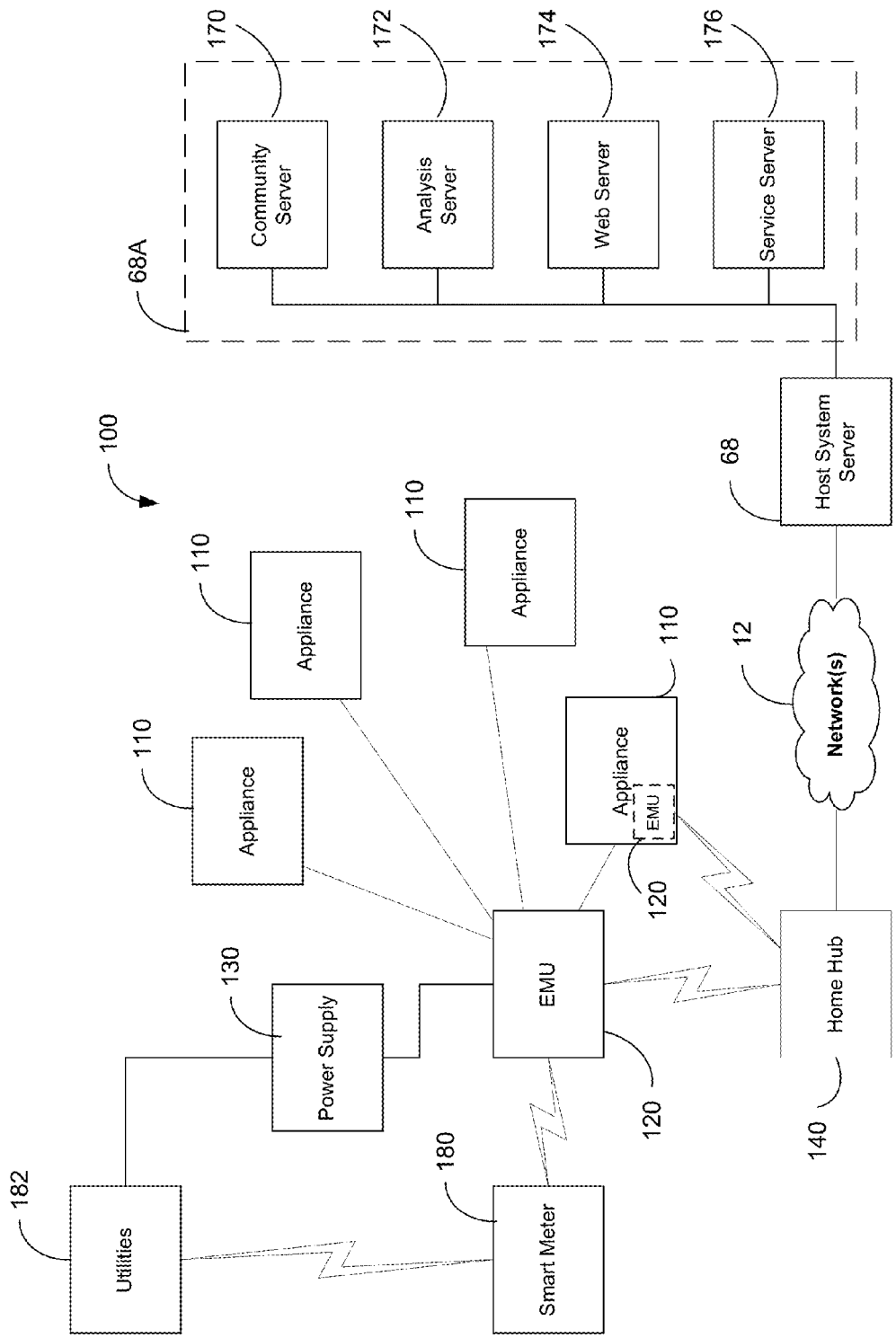
FIG. 3 is a system diagram of an example community energy management configuration.

FIG. 3 illustrates an example community energy management system 100 in accordance with one example of the present disclosure. In this example, the system 100 comprises at least one electronic device, such as a home appliance 110 in communication with one or more Energy Management Unit (EMU) 120. The example EMU 120 may be a smart grid compatible, energy monitoring device externally connected via a wall-plug form factor, internally connected (i.e. built-in) to the at least one appliance 110, or otherwise suitably electrically coupled to the appliance 110. In the illustrated example, one EMU 120 is shown as an external device that plugs directly into an ordinary 120 volt, 60 Hz electrical socket 130, while another EMU 120 is shown as being integrally contained within the appliance 110. It is further contemplated that the EMU 120 may be adapted to plug and/or electrically couple into any suitable power supply including for instance an electrical socket of any suitable voltage and/or prong geometry. It will also be appreciated that the EMU 120 may be powered via any suitable electrical supply including, for example, direct AC and/or DC supplies.

As noted above, the appliance 110 may be any electronic device, such as for example, a washing machine, a dryer, a refrigerator, a television, a coffee maker, etc. It will be understood that there are many other appliances and/or pieces of equipment that may be used with the EMU 120 without departing from the spirit of the present disclosure. Furthermore, it will be appreciated that if multiple EMUs 120 are utilized in the system 100, each EMU may be optionally adapted to communicate with multiple appliances 110, with other EMU(s) 120, and/or communicate with a home hub 140 as will be described.

Figure 4:
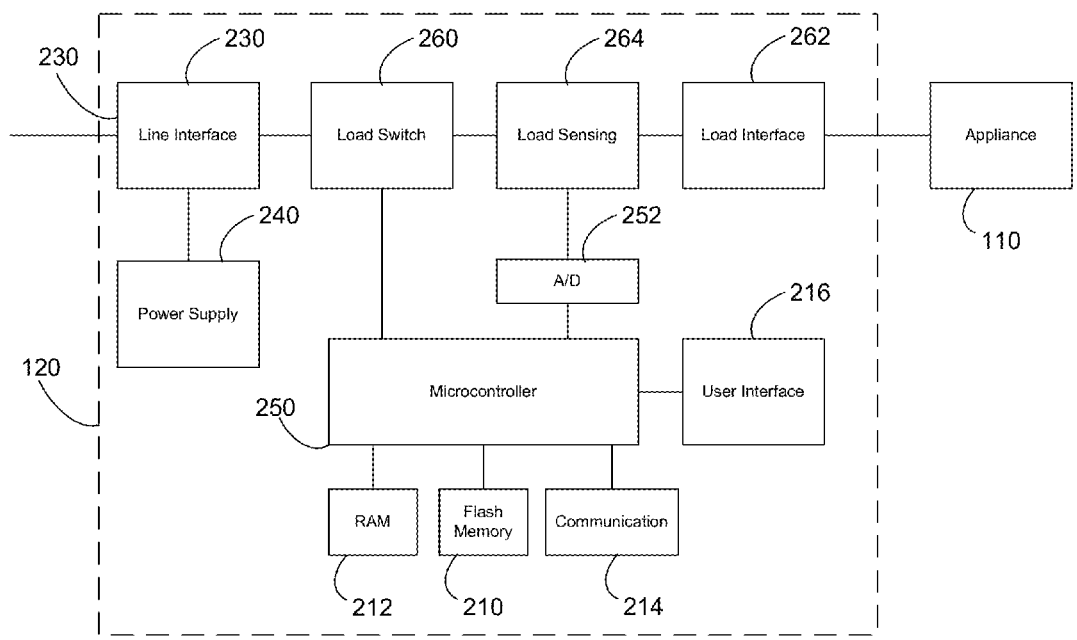
FIG. 4 is a component diagram of the example Energy Management Unit utilized in the system diagram of FIG. 3.

At least one example EMU 120 is configured to measure the energy usage of the connected appliance(s) 110 or other piece(s) of equipment. Still further, at least one example EMU 120 is configured to store the energy usage data of the connect appliance(s) in its own memory. For instance, as illustrated in FIG. 4, an example EMU 120 includes a flash memory 210 and/or a random access memory (RAM) 212 to store the collected energy use data. The EMU 120 may use other types of memory in addition to, or in lieu of, flash memory 210 and RAM 212 to store the energy use data. The energy use data is, in turn, transmitted to the home hub 140 (see FIG. 3) such as, for example, a personal computer (PC), terminal, router, smartphone, tablet, or other suitable device via a communicator 214, such as a wireless connection using the local area network with WiFi, ZigBee®, Bluetooth, infrared, or the like. While the connection between the EMU 120 and the home hub 140 is illustrated as being a communicator 214, a person of ordinary skill in the art will recognize that the data connection may be any suitable connection including a wired and/or wireless connection as desired. Software, firmware, and/or hardware executing and/or contained within the home hub 140 processes the transmitted energy use data generated by the connected appliance 110 and EMU 120 and is adapted to at least one of display the data on an integrated and/or external display having a user interface 216, and/or transmit the data to the host system server 68, or other suitable service, such as a cloud service through the network 12, including an Internet, cellular, wireless, wired, LAN, tethered, and/or any other suitable connection.

In the illustrated example, the transmitted energy use data is segregated into different services and/or servers within the data repository 68A as shown in FIG. 3, including a community server 170, an analytics server 172, a web server 174, or a service server 176. While the energy use data is segregated in the illustrated example, the data need not be divided or alternatively may be divided even further as desired. The example EMU 120 facilitates the ability for an operator to offer consumers cost saving recommendations and usage optimization.

Referring again to FIG. 3, the home hub 140 may also transmit energy use data to a smart meter 180, via a wireless connection using ZigBee® or the like. In this example, the smart meter 180 is a typical electrical meter that records consumption of electric energy in predefined intervals, such as intervals of an hour or less and communicates consumption information back to a utility company 182 for monitoring and/or billing purposes. Typically, the smart meter 180 enables two-way communication between the meter and a central system. Accordingly, the utility company 182 providing the power to the appliance 110 and/or other equipment, can access the energy use data stored on the smart meter 180 for further review.

Figure 5:
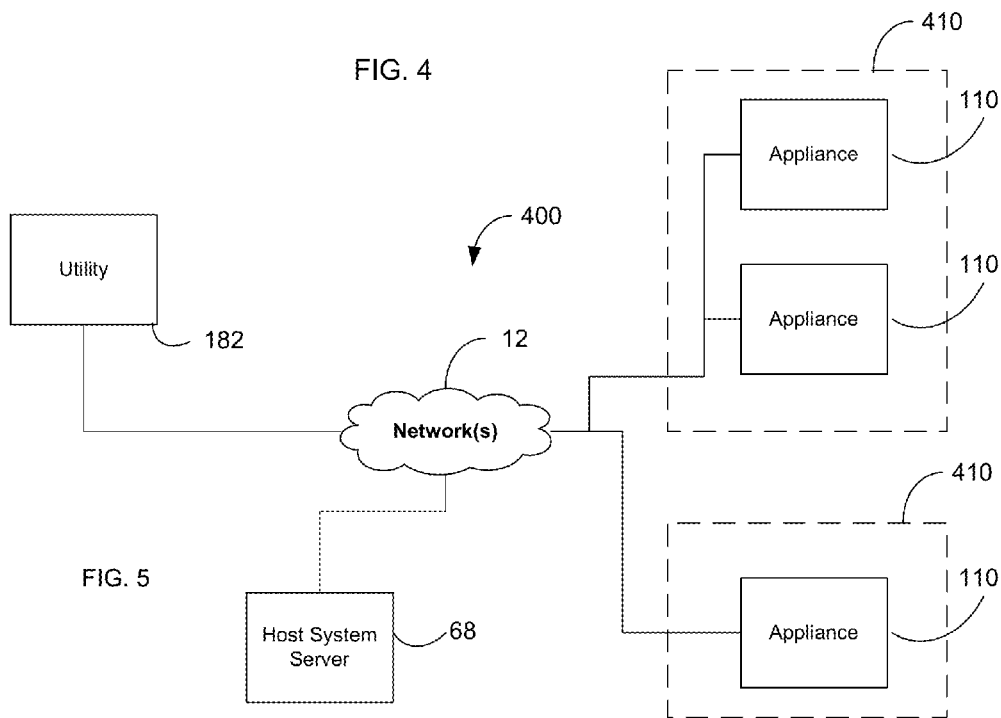
FIG. 5 is a system diagram of an example community of electronic devices.

Referring now to FIG. 5, an example energy management community 400 is illustrated showing a plurality of home hubs 140 communicating with the utility 182 and the network 12. In the illustrated example, the utility 182 is capable of communicating with the home hubs 140 via any suitable means including, for example, via a cellular network. Each of the example home hubs may be distributed in a subset of the community, such as for example, a single home 410, or may be located in multiple homes 410, such as for example, in a residential neighborhood. In the example community 400, the energy consumption data for each appliance 110 connected to each EMU 120 communicating with each of the connected home hubs 140 is collected and forwarded through the network 12 to the analytics server 172. For instance, the analytics server 172 may collect any relevant data including, for example, appliance information for each registered appliance 110, power drain consumption (PD), Power drain per cycle (PCy), length of operational cycle (TL), utility demand response (DR) information, total amount of home power load allowed during the utility demand response (DR), and/or any other suitable data. It will be appreciated that this information may be provided in any suitable manner, including for example, by manually entering the data, registering the appliance, automatically detecting the information, by a third-party, by the manufacturer, and/or any other suitable method.

One example EMU 120 for use in the community 400 is shown in FIG. 4. The example EMU 120 comprises a line interface 230 which is inductively coupled to the power line to rectify and provide line powered DC voltage 240 to a microcontroller 250, the memories 212, 210, an analog-to-digital (A/D) converter 252, the communicator 214, and the user interface 216. A load switch 260, such as for example, a solid state relay removes or applies power to the coupled appliance 110 through a load interface circuit 262. The example load switch 260 and the example load interface 262 are in series with a load monitoring/sensing circuit 264. The example load monitoring/sensing circuit 264 provides a stepped-down current signal which is within the operating range of the A/D converter 252 for subsequent sampling by the microcontroller 250. As previously described, the communicator 214 periodically transmits energy use data to the home hub 140 via a wireless and/or wired connection using the local area network with WiFi, ZigBee®, or the like. The user interface 216 communicates the status of the EMU 120 and provide at least one user interface element which allows the user to interact with the EMU 120. For instance, the user interface 216 may provide a display on which energy use data and the like are shown to the user. Additionally, the user interface 216 may also provide one or more input user interface elements through which the user can toggle interact with the EMU 120 to retrieve further information regarding energy use, to on and/or off various appliances including the appliance 110, to customize various features and/or settings of the EMU 120 depending on the particular appliance or piece of equipment connected to the EMU 120, to customize various user preferences, etc.

Different utilities 182 may have different ways to assign the maximum power load per community 400 based upon any number of factors relative to the utilities' unique environments. In one example, it can be assumed that the total power allocated by the utility to the community 400 is based on 80% of the total peak power consumption of all the homes 140 in the community 400. Accordingly, as long as the community 400 as a whole is below the maximum power load allocation, then there is no inconvenience to the consumer of delaying usage of the appliance 110.

Figure 6:
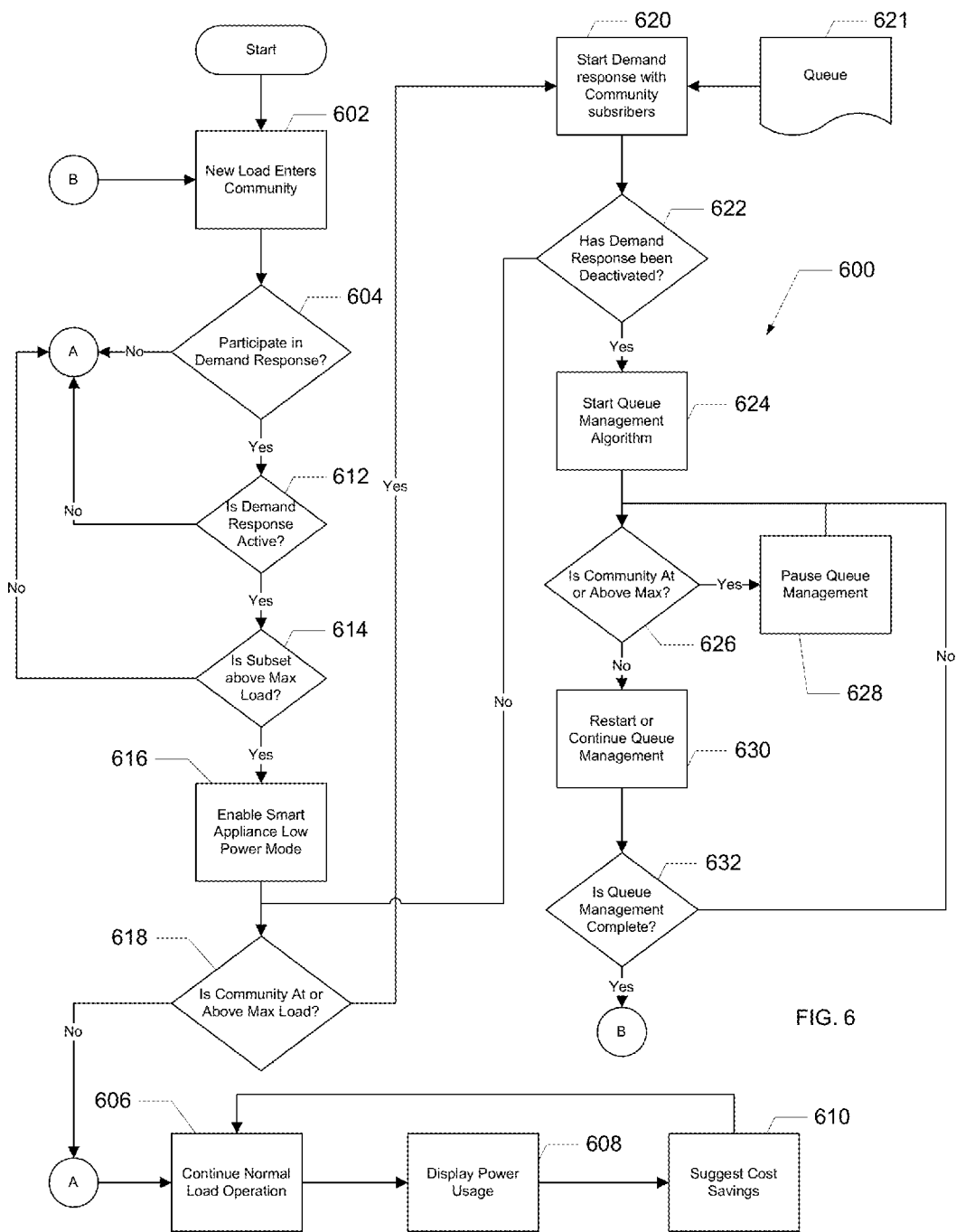
FIG. 6 is a flow chart describing an example algorithm to perform energy management for a community of electrical devices.

To provide one example method of schedule energy usage, a community energy management process 600 is shown in FIG. 6. In the illustrated example, the process 600 begins at a block 602 wherein a new load, such as a new appliance 110 is detected by at least one of the EMU 120, the home hub 140, and/or the host system 68. The detected load may include data representative of the estimated load for the device cycle. In at least one example, the data source for the estimated load is the manufacturer, the device itself, and/or the average load usage data stored, for example, in the EMU 120. The process 600 then determines whether the customer has opted to participate in a demand response pricing structure at a block 604. If the customer has not opted to participate, the process 600 continues on to a block 606 where the operation of the new load is allowed to operate normally (e.g., without any energy controlling). In this instance, allowing the appliance 110 to operate under a normal power usage may entail displaying power usage at a block 608, such as for example on the user interface 216 of the EMU 120, and may include suggested cost savings at a block 610.

If the process 600 determines that the customer has opted in to participation with demand response pricing, the process then determines in the demand response pricing is active at a block 612. If demand response pricing is not active, then the new load is allowed to operate normally at the block 606. If however, demand response pricing is active, the process 600 utilizes data collected from the utility 182 to determine if the individual total allowed home power load is above a precalculated level at a block 614. In this example, the individual total allowed home power load is set equally by the number of homes in the community 400. It will be appreciated, however, that many other methods of determining the individual total allowed home power load may be utilized as desired.

If the process 600 determines that the home is not above the individual total allowed home power load, the appliance 110 is allowed to operate under normal conditions. If however, the process 600 determines that the home is above the individual total allowed home power load, a command is sent at block 616 to cause the appliance 110 to operate in a low power mode (if available), and/or otherwise limit the appliance's power consumption load. In one example low power mode, the appliance 110 is still operational, but operates at a lower power consumption, thus requiring longer to complete its operation. Following the enabling of the low power load, the process 600 again utilizes data collected from the utility 182 to determine if the total allowed power load for the entire community 400 is above a pre-calculated level at a block 618. If the total community power load is below the pre-calculated level, then the process 600 continues to allow normal operation at block 606, albeit with the new appliance operating in a limited power consumption load.

If the process 600 determines that the community 400 is at or above the total community power load, then the process 600 limits any new loads at block 620 by delaying the operation of the new load until after the demand response period has ended. the delayed loads are placed in a holding queue 621 in a first-in sequence. Once new loads are delayed, the process 600 monitors and determines whether the demand response period has been deactivated at a block 622. If the demand response period has not been deactivated, the process 600 may return to block 618 to monitor the community power allocation. Thus, if the power load of the community 400 falls sufficiently, the limitation on new loads may be lifted as desired.

Once the process 600 determines that the demand response period has been deactivated, the process 600 initialized a queue management process 700 (see FIG. 7), such as a first-in, first-out (FIFO) process at a block 624. The process 700 will be described in greater detail, but in general, the process 700 allows the controlled initialization of any delayed loads while monitoring the power allocation of the community 400 to avoid the rebound peaks as noted. Specially, while the process 700 is performing, the process 600 determines whether the community 400 is at or above the total community power load at a block 626. If the process 600 determines that the community 400 is at or above the total community power load, then the process 600 suspends the process 700 at a block 628 until the total community load falls below the allocation. Once the process 600 determines that the community 400 is below the total community power load, the process 700 continues and/or restarts at a block 630 as necessary. The process 600 then determines whether the process 700 is complete at a block 632 and if not, returns to the block 626 to continue to monitor the community load level. If the process 700 is complete, the process 600 returns to the initial block 602 to await a new load to enter the community 400. In essence, the closed feedback loop provides a mechanism by which to avoid the rebound peaks associated with previous delay methods by intelligently extending the delay to turn-on loads.

Figure 7:
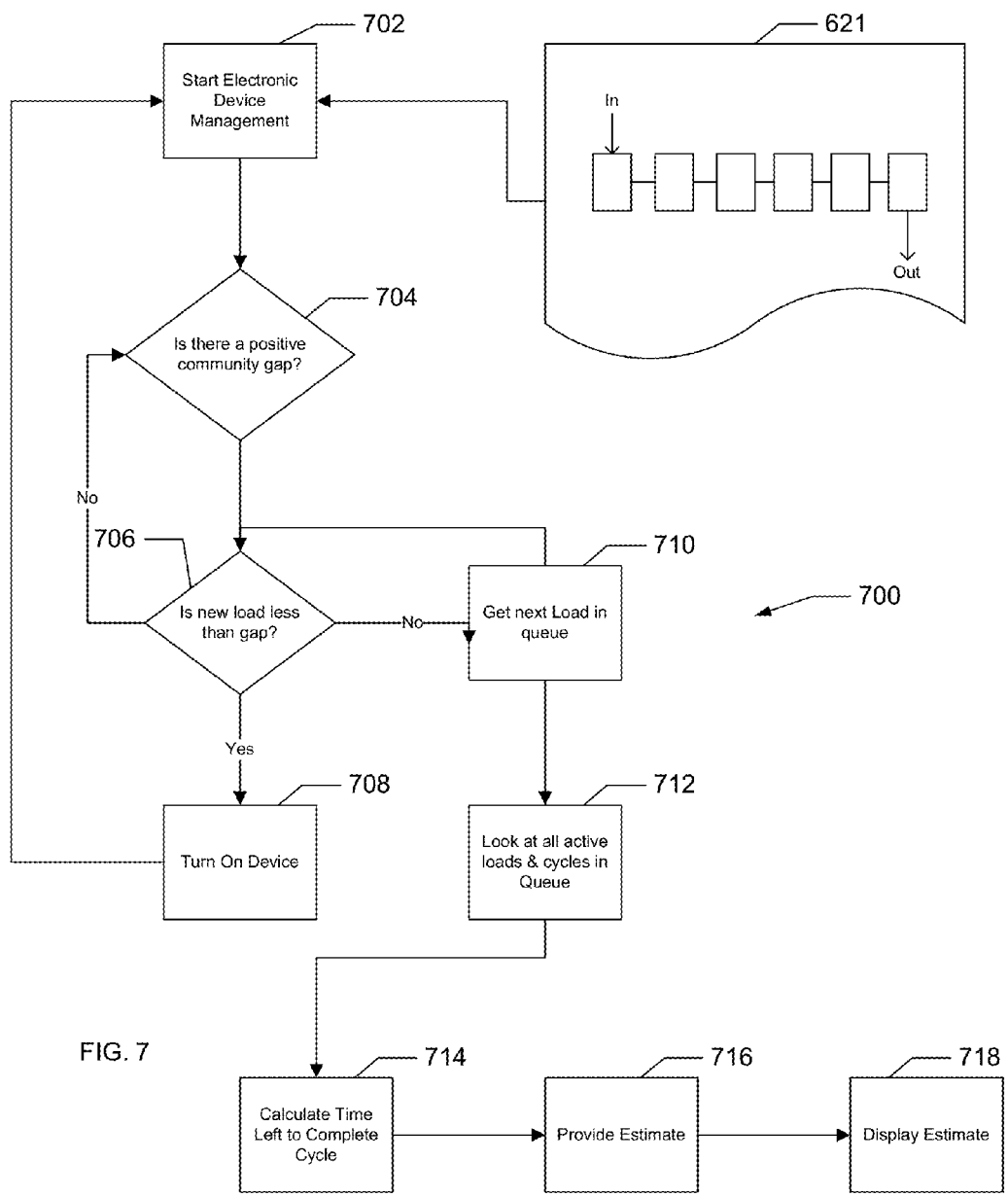
FIG. 7 is a flow chart describing an example queue management for the example algorithm to perform energy management for the community of electrical devices of FIG. 6.

Turning now to FIG. 7, an example queue management process 700 is illustrated in greater detail. In this example, the queue management process is a FIFO sequence, which generally provides that the queue of delayed loads will be initialized in a first-in, first-out sequence. In the illustrated example, the process 700 begins starting the turn-on process by obtaining the appliance from the queue 621 that was the first-in to the queue 621. The process 700 then continues on at a block 704 to determine whether there is a positive load gap between the current community load and the maximum community load level. Specially, the gap is defined as the difference between the community allocation and the actual energy consumption. If there is not a positive gap, the process 600 will continue to monitor the community load level until a gap occurs (e.g., through the disuse of an appliance in the community).

Once there is a positive gap in the community load level, the process 700 determines whether the estimated load level of the current appliance in the queue is lower than the calculated gap level at a block 706. If the estimated load level is less than the load available in the calculated gap, the appliance is turned on at a block 708 and the process 700 returns to the block 702 to process the next appliance in the queue 621. If, however, the estimated load for the current appliance is not less than the calculated gap, the process 700 looks for the next item in the queue at the block 710 and repeats the determination process at block 706. The process 700 will repeat the queue management process until all items in the queue have been started.

Concurrent with the initialization of the loads in the queue 621, the process 700 may look at all active loads and their cycles at block 712, may calculate the time left to complete the cycle a block 714, may calculate an approximate time of turn-on for each item in the queue at a block 716, and may display the calculated information to the user interface 216, or other suitable display, at a block 720. It will be appreciated that the process 700 may provide for a queue management process as is known in the art to allow a user to override, prioritize, and/or customize the queue 621.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A non-transitory computer-readable storage medium having stored thereon computer executable instructions, wherein the instructions perform steps for community energy management, comprising:

receiving from an electrical utility information regarding an operation of at least one load restriction during at least one of high electrical demand or low electrical demand periods;

receiving from the electrical utility information regarding a determined maximum power load for a community of electrical devices;

receiving from the electrical utility information regarding a determined maximum power load for a subset of the community of electrical devices;

receiving from the community of electrical devices information regarding the current load of the community of electrical devices and the subset of the community of electrical devices;

receiving from an electrical device with the subset of the community of electrical devices, a request to operate as a load against the electrical utility;

determining whether the electrical utility is currently operating under a load restriction;

when it is determined that the electrical utility is not currently operating under a load restriction, transmitting instructions to the electrical device to allow the electrical device to operate as a load against the electrical utility, otherwise, determining whether the current load of the subset of the community of electrical devices is at or above the determined maximum power load for the subset of the community of electrical devices;

when it is determined that the current load of the subset of the community of electrical devices is not at or above the determined maximum power load for the subset of the community of electrical devices, transmitting instructions to the electrical device to allow the electrical device to operate in a reduced load capacity against the electrical utility, otherwise, determining whether the current load of the community of electrical devices is at or above the determined maximum power load for the community of electrical devices;

when it is determined that the current load of the community of electrical devices is not at or above the determined maximum power load for community of electrical devices, transmitting instructions to the electrical device to allow the electrical device to operate as a load against the electrical utility, otherwise placing the request to operate as a load against the electrical utility in a queue;

monitoring the electrical utility to determine when the electrical utility is not currently operating under a load restriction; and transmitting instructions to at least one of the electrical devices in the queue to allow the electrical device to operate as a load against the electrical utility, and removing the electrical device from the queue.

2. The non-transitory computer-readable storage medium as defined in claim 1, further comprising transmitting instructions to at least one of the electrical devices in the queue to allow the electrical device to operate as a load against the electrical utility only when the load required by the electrical device will not cause the current load of the community of electrical devices to exceed the maximum power load for the community of electrical devices.

3. The non-transitory computer-readable storage medium as defined in claim 1, wherein the electrical device first placed in the queue is the electrical device first removed from the queue.

4. The non-transitory computer-readable storage medium as defined in claim 1, wherein the queue operates in a first-in, first-out model, but if the current electrical devices in the queue would cause the current load of the community of electrical devices to exceed the maximum power load for the community of electrical devices, the electrical device remains in the queue and the next electrical device in the queue is removed from the queue.

5. The non-transitory computer-readable storage medium as defined in claim 4, wherein the next electrical device is removed from the queue only if the electrical device would not cause the current load of the community of electrical devices to exceed the maximum power load for the community of electrical devices.

6. The non-transitory computer-readable storage medium as defined in claim 1, wherein the electrical utility is a smart grid.

7. The non-transitory computer-readable storage medium as defined in claim 1, wherein the subset of the community of electrical devices is at least one of a residential address or business location.

8. The non-transitory computer-readable storage medium as defined in claim 1, further comprising calculating an estimated time to operation for at least one electrical device in the queue.

9. The non-transitory computer-readable storage medium as defined in claim 8, further comprising providing a user interface comprising user interface elements for displaying the calculated estimated time to operation at least one electrical device in the queue.

10. The non-transitory computer-readable storage medium as defined in claim 1, further comprising providing a user interface comprising user interface elements for allowing a user to override the queue.

11. The non-transitory computer-readable storage medium as defined in claim 1, further comprising providing a user interface comprising user interface elements for allowing a user to customize the queue.

12. The non-transitory computer-readable storage medium as defined in claim 1, further comprising providing a user interface comprising user interface elements for allowing a user to enter information utilized by the computer-readable media to prioritize the queue.

13. The non-transitory computer-readable storage medium as defined in claim 1, further comprising receiving information from an electronic data source regarding an estimate of the total load for the electrical device's request to operate as a load against the electrical utility.

14. The non-transitory computer-readable storage medium as defined in claim 13, wherein the electronic data source is a manufacturer.

15. The non-transitory computer-readable storage medium as defined in claim 13, wherein the electronic data source is the electronic device.

16. A method of community energy management in a computer system comprising:
   in a computer system comprising at least one processor coupled to memory:
   receiving from an electrical utility information regarding an operation of at least one load restriction during at least one of high electrical demand or low electrical demand periods;
   receiving from the electrical utility information regarding a determined maximum power load for a community of electrical devices;
   receiving from the electrical utility information regarding a determined maximum power load for a subset of the community of electrical devices;
   receiving from the community of electrical devices information regarding the current load of the community of electrical devices and the subset of the community of electrical devices;
   receiving from an electrical device with the subset of the community of electrical devices, a request to operate as a load against the electrical utility;
   determining whether the electrical utility is currently operating under a load restriction;
   when it is determined that the electrical utility is not currently operating under a load restriction, transmitting instructions to the electrical device to allow the electrical device to operate as a load against the electrical utility, otherwise, determining whether the current load of the subset of the community of electrical devices is at or above the determined maximum power load for the subset of the community of electrical devices;
   when it is determined that the current load of the subset of the community of electrical devices is not at or above the determined maximum power load for the subset of the community of electrical devices, transmitting instructions to the electrical device to allow the electrical device to operate in a reduced load capacity against the electrical utility, otherwise, determining whether the current load of the community of electrical devices is at or above the determined maximum power load for the community of electrical devices;
   when it is determined that the current load of the community of electrical devices is not at or above the determined maximum power load for community of electrical devices, transmitting instructions to the electrical device to allow the electrical device to operate as a load against the electrical utility, otherwise placing the request to operate as a load against the electrical utility in a queue;
   monitoring the electrical utility to determine when the electrical utility is not currently operating under a load restriction; and
   transmitting instructions to at least one of the electrical devices in the queue to allow the electrical device to operate as a load against the electrical utility, and removing the electrical device from the queue.

17. The method as defined in claim 16, further comprising transmitting instructions to at least one of the electrical devices in the queue to allow the electrical device to operate as a load against the electrical utility only when the load required by the electrical device will not cause the current load of the community of electrical devices to exceed the maximum power load for the community of electrical devices.

18. The method as defined in claim 16, wherein the electrical device first placed in the queue is the electrical device first removed from the queue.

19. The method as defined in claim 16, wherein the queue operates in a first-in, first-out model, but if the current electrical devices in the queue would cause the current load of the community of electrical devices to exceed the maximum power load for the community of electrical devices, the electrical device remains in the queue and the next electrical device in the queue is removed from the queue.

20. The method as defined in claim 19, wherein the next electrical device is removed from the queue only if the electrical device would not cause the current load of the community of electrical devices to exceed the maximum power load for the community of electrical devices.

21. The method as defined in claim 16, wherein the electrical utility is a smart grid.

22. The method as defined in claim 16, wherein the subset of the community of electrical devices is at least one of a residential address or business location.

23. The method as defined in claim 16, further comprising calculating an estimated time to operation for at least one electrical device in the queue.

24. The method as defined in claim 23, further comprising providing a user interface comprising user interface elements for displaying the calculated estimated time to operation at least one electrical device in the queue.

25. The method as defined in claim 16, further comprising providing a user interface comprising user interface elements for allowing a user to override the queue.

26. The method as defined in claim 16, further comprising providing a user interface comprising user interface elements for allowing a user to customize the queue.

27. The method as defined in claim 16, further comprising providing a user interface comprising user interface elements for allowing a user to enter information utilized by the computer-readable media to prioritize the queue.

28. The method as defined in claim 16, further comprising receiving information from an electronic data source regarding an estimate of the total load for the electrical device's request to operate as a load against the electrical utility.

29. The method as defined in claim 28, wherein the electronic data source is a manufacturer.

30. The method as defined in claim 28, wherein the electronic data source is the electronic device.

* * * * *

UNITED STATES PATENT AND TRADEMARK OFFICE
CERTIFICATE OF CORRECTION

| | | |
|---|---|---|
| PATENT NO. | : 8,626,348 B2 | Page 1 of 1 |
| APPLICATION NO. | : 13/298762 | |
| DATED | : January 7, 2014 | |
| INVENTOR(S) | : Owens et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 98 days.

Signed and Sealed this
Twelfth Day of May, 2015

Michelle K. Lee
*Director of the United States Patent and Trademark Office*